Patented Apr. 24, 1951

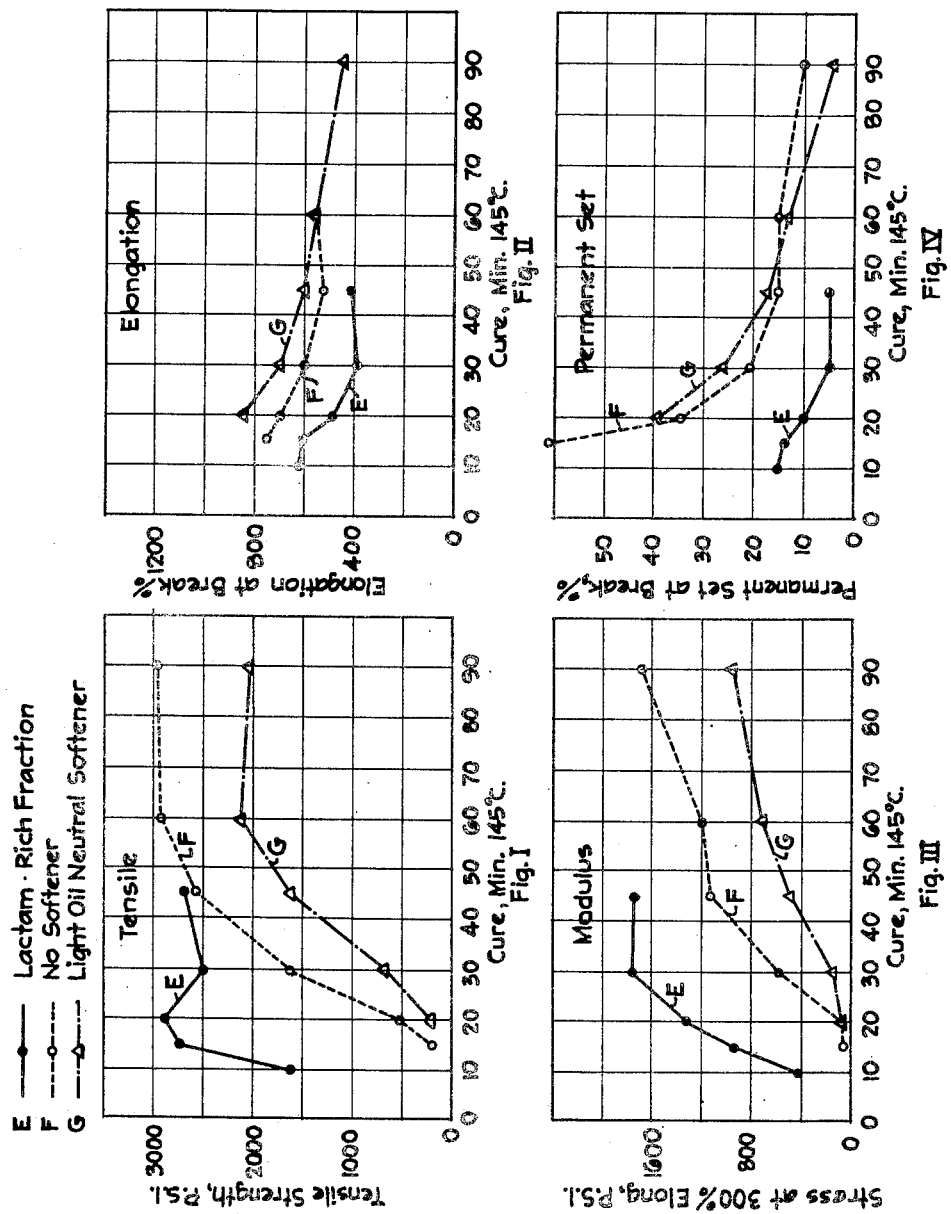
Inventors: Daniel B. Luten Jr.
Billee O. Blackburn
Frank M. McMillan
By their Agent:

2,550,363

UNITED STATES PATENT OFFICE 2,550,363

LACTAM PLASTICIZER FOR RUBBERS

Daniel B. Luten, Jr., Billee O. Blackburn, and Frank M. McMillan, Berkeley, Calif., assignors to Shell Development Company, San Francisco, Calif., a corporation of Delaware Application October 4, 1946, Serial No. 701,288

12 Claims. (Cl. 260—30.2)

This invention relates to novel synthetic rubber compositions. The invention relates more particularly to improved compositions of butadiene polymerizates, or copolymers of butadiene with other polymerizable compounds, in admixture with a lactam plasticizing agent.

In the production of rubber-like materials from synthetic polymers, the starting materials are generally subjected to a mechanical mastication or milling operation to modify the physical properties thereof and to add ingredients essential to subsequent operations such as, for example, vulcanization. The production of rubber-like materials possessing desirable characteristics necessitates the further addition to the polymeric starting materials of agents capable of facilitating the initial masticating and subsequent operations, and of imparting desirable characteristics to the polymeric product of the initial steps as well as to the rubber-like product of the subsequent operations. Many compounds have been disclosed heretofore, the addition of which to the starting materials is intended to attain specific, advantageous effects upon the milling and subsequent vulcanization operations and to modify and improve the characteristics of the rubber-like products produced. The addition of a plurality of agents, each directed to the attainment of a specific or a well-defined group of characteristics is generally resorted to, to attain the necessary desirable properties of the final product.

Agents heretofore added are generally limited in their beneficial function, resulting in the attainment of only a small part of the characteristics desired in the intermediate and final rubber-like materials. For example, in the production of rubber-like materials from butadiene polymers and copolymers, the addition of an agent capable of producing desired plasticity and tack during milling operations is not often effective in producing desirable qualities such as resistance to abrasive wear, tearing and cutting, or a low stiffening temperature in the final product. The addition of a separate agent or agents must therefore be resorted to, to attain improvement in the latter characteristics. Since each of the individual agents must generally be added in substantial amounts to obtain the specific results, unduly large amounts of such materials must often be added, detracting materially from the attainment of products depending upon a greater content of the polymeric starting material.

It is an object of the present invention to obviate at least a substantial part of the above difficulties by the provision of improved synthetic rubber compositions comprising a plasticizing agent providing a combination of improved characteristics to the intermediate and vulcanized products of the synthetic rubber processing operations, the attainment of which to a similar degree heretofore necessitated the use of a plurality of separate plasticizing agents.

Another object of the invention is the provision of improved synthetic rubber compositions containing a plasticizer markedly accelerating the attainment of optimum cure during the vulcanization thereof.

A particular object of the invention is the provision of improved synthetic rubber compositions comprising butadiene polymers or copolymers containing a plasticizing agent imparting a combination of highly desirable improved characteristics to the composition reflected by improved resistance to tearing, cutting, improved permanent set and stiffening temperature of their vulcanizers.

Other objects and advantages of the present invention will become apparent from the following detailed description thereof.

The highly advantageous characteristics of the synthetic rubber compositions of the invention are attributable to the presence therein of a lactam or lactam-containing plasticizer. The lactams are organic ring compounds containing the grouping

in the ring. The carbon and nitrogen atoms of the characteristic lactam group —NH—CO— of the lactams contemplated in the present invention are linked by an unsubstituted hydrocarbon radical. They are cyclic amides of carboxylic acids, a typical member of which is alpha-piperidone.

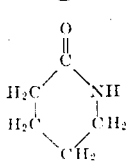

Other examples of the broad class of lactams, a member or several members of which are incorporated into a synthetic rubber to obtain the novel compositions of the invention comprise, for example, 2-pyrrolidone, 6-methyl-2-piperidone, oxindole, 2-oxo-hexamethylenimine, the lactam of ortho-aminocinnamic acid. The compositions of the invention may comprise a single lactam or a mixture of several lactams.

The lactams incorporated in the compositions of the invention may be of natural occurrence or synthetically produced. One method of their production comprises, for example, the intramolecular condensation of amino carboxylic acids brought about by heating the amino carboxylic acid, the lactam of which is desired. A part of the lactam or lactams may be present in the composition in the enol form.

A particularly suitable plasticizer incorporated with synthetic rubber in accordance with the process of the invention comprises the mixed lactams obtained by their extraction from the distillate products obtained in the pyrogenic treatment of naphthenic petroleum or naphthenic petroleum fractions. Petroleum fractions or hydrocarbon mixtures substantially free of, or containing only a minor amount of nitrogen-containing compounds leading to the production of the desired lactams or lactam-containing mixtures may have added thereto, prior to the pyrogenic treatment, suitable amounts of amino carboxylic acids capable of leading to the formation of the desired lactams at the elevated temperatures.

A method for the production of mixed lactams, suitable for incorporation in the synthetic rubber compositions of the invention, comprises the mixed lactams extracted from lactam-containing phenolic extracts of cracked petroleum distillates by any suitable means. Of the mixed lactams thus obtained fractions having an initial boiling point of at least 135° C. at 10 mm. of mercury are particularly effective. Preferred fractions comprise the mixed lactams of petroleum origin having a boiling range of from about 250° C. to about 360° C., still more preferably from about 290° C. to about 325° C. at atmospheric pressure. One method of obtaining the mixed lactams of petroleum origin suitable for incorporation in the synthetic rubber compositions of the invention is illustrated by the following example.

*Example I*

A naphthenic pressure distillate containing an appreciable amount of lactams was treated with 40° Bé. sodium hydroxide. The resulting mixture was subjected to gravitational separation to effect the formation of a lactam-containing sodium phenolate layer. The resulting lactam-containing phenolate layer was steam distilled, leaving a residue of from about 20° to 13° Bé. gravity. This residue was blown with flue gas and subjected to fractional distillation. A crude lactam-containing phenolic fraction (A) having the following properties was recovered:

| | |
|---|---|
| Specific gravity, 20/4° C. | 1.0350 |
| Viscosity at 210° F. cs. | 5.3 |
| Viscosity at 100° F. cs. | 103.3 |
| Viscosity index | −364 |
| Carbon per cent | 78.9 |
| Hydrogen do | 9.0 |
| Nitrogen do | 2.0 |
| Sulfur | 0.3 |
| Neutral oil per cent by volume | 0.4 |
| Acetyl value | 0.502 |
| Distillation range °C. | 281–330 |

Soluble in dilute aqueous caustic solution

The crude lactam-containing phenolic fraction thus obtained was further treated to separate a relatively pure fraction of mixed lactams as follows:

One part of the crude lactam-containing phenolic fraction was shaken with one part of pyridine and two parts of diisopropyl ether. The lactams were extracted from the treated crude lactam-containing phenolic fraction with water. The raffinate phase consisted predominantly of alkyl phenols dissolved in diisopropyl ether. The water was distilled from the extract phase leaving mixed lactams. The lactams thus obtained, boiling in the range of from about 240° C. to about 325° C., were subjected to fractional distillation to obtain a fraction of mixed lactams (B) having the following properties:

| | |
|---|---|
| Boiling range at 10 mm. Hg °C. | 141.5 to 150 |
| Composition: | |
| Nitrogen per cent | 9.4 |
| Carbon do | 67.7 |
| Hydrogen do | 10.0 |

The polymer constituents of the composition are synthetic, rubber-like materials, such as polymerizates of a conjugated diene hydrocarbon. Representative examples of suitable conjugated diene hydrocarbons are: butadiene; the conjugated pentadienes, such as pentadiene, 2-methyl-1,3-butadiene cyclopentadiene; the conjugated hexadienes, such as 1,3-hexadiene, 2,4-hexadiene, 2-methyl-1,3-pentadiene, 3-methyl-1,3-pentadiene, 4-methyl-1,3-pentadiene; dimethyl-1,3-butadiene; the conjugated heptadienes; the conjugated octadienes; chloroprene etc. Suitable polymer constituents of the compositions of the invention also comprise the copolymers of a conjugated diene hydrocarbon with at least one other polymerizable compound. By other polymerizable compounds, reference is made to compounds having at least one olefinic linkage therein which enables coupling of the molecule with the conjugated diene hydrocarbon molecules to form the copolymer. The copolymers are interpolymerizates of a conjugated diene hydrocarbon with one or more other conjugated diene hydrocarbons and/or one or more other compounds copolymerizable with the conjugated diene hydrocarbons. The following are illustrative of compounds containing one olefinic double bond copolymerizable with a conjugated diene hydrocarbon: isobutylene, styrene, acrylonitrile, methacrylonitrile, acrolein, methacrolein, methyl vinyl ketone, methyl isopropenyl ketone, methyl methacrylate, and the like. Of the suitable polymer constituents of the compositions, the polymerizates of butadiene and copolymers of butadiene with other polymerizable compounds are preferred. Examples of preferred polymer constituents consisting of copolymers of butadiene comprise the copolymers of butadiene with one or more of the following: acrylonitrile, methacrylonitrile, a hexadiene such as 2-methyl-1,3-pentadiene, 4-methyl-1,3-pentadiene, styrene, isoprene, and the like. The compositions of the invention are not limited by the method of preparation of the rubber-like polymerizate constituents. Particularly preferred compositions are, however, obtained by the use of a rubber-like polymerizate obtained by the emulsion polymerization methods.

The lactams may be incorporated into the polymer by any suitable masticating or milling operation. A suitable method comprises their addition to the polymer by milling with a roll mill at an elevated temperature in the range of, for example, from about 30° C. to about 100° C. They may be incorporated in the polymer by addition as such, as a solution, or as an emulsion to a latex comprising or producing the polymer constitutents of the composition of the invention. The manner in which the lactams are added to the compositions of the invention may be governed to some degree by the ultimate to which they are put. Thus, when the compositions are employed as ingredients or components of rubber cements, the lactams may be added to the solutions of the polymer from which the cements are obtained.

The addition of the lactams to the polymer results in compositions generally having excellent milling characteristics, and possessing a degree of tack and plasticity suitable for efficient practical operation. The lactam or mixture of lactams are added as such or in a suitable solvent. A particularly advantageous synthetic rubber composition is obtained by the addition of the lactams in solution in high boiling alkyl phenols. A suitable lactam-containing phenolic mixture comprises the crude alkali-soluble lactam-rich alkyl phenol extract having a boiling range of from about 250° C. to about 360° C. and preferably from about 290° C. to about 325° C. at 760 mm. such as, for example, that extracted from the products of the pyrogenic treatment of naphthenic petroleum distillate fractions as indicated above.

The proportion of lactams or lactam-containing plasticizer in the synthetic rubber compositions of the invention may vary considerably depending to some extent upon the particular components of the composition and the degree of characteristics imparted by the plasticizer desired. An advantage of the lactams or lactam-rich plasticizing agent resides not only in the combination of a plurality of highly desired characteristics imparted to the intermediate and final products resulting in the processing of the compositions but also in the fact that a relatively small proportion of the plasticizer generally suffices to obtain these results. In general, an amount of lactams or lactam-rich plasticizer in the range of from about 10 to about 25 parts per 100 parts of polymer by weight are used. Lesser or greater proportions may, however, be incorporated in the synthetic rubber compositions within the scope of the invention.

The presence of ingredients other than the lactams or lactam-rich plasticizer in the synthetic rubber compositions may be resorted to and is usually necessary and desirable. The nature of the particular additional ingredients added will depend upon the use to which the compositions are put. Thus in preparing a composition for processing or vulcanizing to a finished synthetic rubber article, a number of substances are generally incorporated into the composition. The synthetic rubber composition may contain, for example, an anti-oxidant or age retarder such as an amino compound like phenyl beta naphthylamine or ketone-amine reaction product. An organic vulcanization accelerator is incorporated like benzothiazyl disulfide, tetramethyl thiuram disulfide, mercapto benzothiazol, etc., together with an activator for the accelerator such as, for example, zinc oxide. Various finely divided solids may be added as fillers and reinforcers, such as channel black, furnace black, thermal black, fine size whitings, and clays, light calcined magnesia, and suitable fillers which are essentially inert such as barytes and lithopone. In order that vulcanization will occur, the composition will generally contain sulfur or sulfur-liberating compounds. Certain other ingredients are also useful in very minor amounts such as stearic or lauric acid and waxes, both paraffinic and natural. The incorporation may be effected by milling or any other mechanical incorporation. The presence of the lactams or lactam-rich plasticizer in the composition it has been found greatly facilitates the uniform incorporation of these additional ingredients into the composition.

The lactam-containing synthetic rubber compositions containing the various ingredients are useful as compounded rubber-like material which may be vulcanized. The vulcanization of the compounded materials is executed in the usual manner by application of heat and pressure. In this manner a great number of useful articles may be prepared.

The combination of improved characteristics possessed by the lactam-containing synthetic rubber compositions of the invention is evidenced by the following example.

*Example II*

Compositions were prepared containing a copolymer of butadiene and acrylonitrile, known commercially as Hycar O. R.–15, in combination with the mixed lactams (B) of Example I boiling in the range of 141.5 to 150° C. at 10 mm. Hg obtained from cracked naphthenic petroleum. Other compositions were prepared containing the Hycar O. R.–15 copolymer in combination with the lactam-rich alkyl phenols (A) of Example I, boiling in the range of from 281° C. to 330° C. at atmospheric pressure, obtained from cracked naphthenic petroleum. For the purpose of comparison, compositions were also prepared and evaluated in which dibutyl metacresol, a purely pheonlic type plasticizer of known effectiveness, and dibutyl sebacate, a freeze depressant ester plasticizer, were used instead of the lactams and lactam-rich alkyl phenols. The compounded mixtures were prepared according to the formula below, the ingredients having been added in the order listed.

| | Parts by weight |
|---|---|
| Rubber-like copolymer (Hycar O. R.–15) | 100 |
| Phenyl beta-naphthylamine | 1.0 |
| Plasticizer | Varied |
| Zinc oxide | 5.0 |
| Channel black | 50 |
| Stearic acid | 1.0 |
| Sulfur | 1.25 |

The compositions so prepared were vulcanized at 153° C. for a period of time indicated for each composition in the following table. Where several values are given, these are the results obtained with separately compounded samples.

| Plasticizer | Lactams (B) | | | Lactam-Rich Phenolic Fraction (A) | | Dibutyl Metacresol | | Dibutyl Sebacate | |
| --- | --- | --- | --- | --- | --- | --- | --- | --- | --- |
| Parts per 100 parts Hycar O. R. | 15 | | | 15 | 25 | 15 | 25 | 15 | 25 |
| Unvulcanized compound: | | | | | | | | | |
| (1) Incorporation time, min. | 11 | | | 8 | 11 | 11 | 15 | 17 | 33 |
| (2) General milling rating | Excellent | | | Good | Good | Good | Good | Fair | Good |
| (3) Tack | Fair | | | Fair | Fair | Fair | Fair | None | Poor |
| Vulcanizate: | | | | | | | | | |
| (1) Time of cure, min. | 30 | 45 | 60 | 60 | 60 | 60 | 60 | 60 | 60 |
| (2) Tensile strength | 3,190 | 2,875 | 3,100 | 4,045 | 3,060 | 4,030 | 3,685 | 3,605 | 2,935 |
| (3) Ultimate elongation, per cent | 460 | 365 | 360 | 645 | 750 | 490 | 680 | 470 | 530 |
| (4) Stress at 300% elongation, p. s. i. | 1,650 | 2,200 | 2,500 | | | 2,120 | 1,180 | 1,860 | 1,150 |
| (5) Permanent set at break | 10 | 6 | 6 | | 13 | 11 | 16 | 10 | 15 |
| (6) Tear strength, lbs./in | 300 | 250 | 250 | 275 | 289 | 220 | 195 | 210 | 180 |
| (7) Stiffening temp., °C | −12.5 | −12 | −12 | −9 | −7 | +9 | −3 | −23 | −29 |
| (8) Cut growth, kc./cm | 1.3 | 1.2 | 0.8 | 4.1 | 8.2 | 3.9 | 3.1 | 0.6 | 1.1 |
| Vulcanizate aged 7 days at 80° C.: | | | | | | | | | |
| (1) Ultimate elongation, per cent | | | | 525 | 475 | 455 | 440 | 375 | 420 |
| (2) Tear strength, lbs./in | | | | 265 | 320 | 205 | 240 | 215 | 180 |
| (3) Cut growth, kc./cm | | | | 3.7 | 4.6 | 1.9 | 3.0 | 0.6 | 0.3 |

It is apparent from the foregoing example that the lactams and lactam-rich alkyl phenols possess the advantage of rapid incorporation into the synthetic rubber compositions resulting in mixtures of good tack and processing characteristics. It is further apparent therefrom that the synthetic rubber compositions containing lactams, or lactam-rich alkyl phenols, possess a combination of characteristics rendering them far superior to similarly prepared compositions containing either a purely phenolic or ester type plasticizer. The vulcanizates prepared with the lactam-containing compositions of the invention are seen to possess markedly superior service value as evidenced by the above values for permanent set, tear strength, cut growth, stiffening temperature, and age-resistance. The presence of the lactams in the compositions it is seen enables the attainment of stiffening temperatures unattainable with a purely phenolic plasticizer and those obtained with the ester-type plasticizer. The lactams, or lactam-rich alkyl phenols, thus provide a combination of the outsanding advantageous characteristics of the purely phenolic and freeze depressant ester type plasticizers. The presence of the lactams in the compositions of the invention not only provides for the attainment of these combined characteristics with but a single plasticizer, but also enables a marked improvement in properties of the vulcanizates imparted thereto by the phenolic and ester type plasticizers.

Other materials may be added in lesser amounts to the lactam-containing synthetic rubber compositions of the invention. Compositions of unusual and highly advantageous properties are obtained by the addition of the lactams in the form of an admixture with a minor amount of an aromatic petroleum extract. The lactams may be combined with the aromatic petroleum extract as such or in the form of a lactam-rich alkyl phenol fraction. Particularly preferred lactam-containing plasticizers comprise the lactam-rich alkyl phenols extracted from cracked naphthenic petroleum distillates as described above in combination with a minor amount, generally from about 1% to about 20%, preferably from about 5 to about 10%, by weight of the lactam-rich alkyl phenol fraction, of highly aromatic petroleum extract. Suitable aromatic petroleum extracts comprise the aromatic petroleum extracts boiling above about 300° C. at atmospheric pressure obtained by extracting petroleum with a non-reactive, highly polar solvent. Suitable aromatic preferential solvents comprise, for example, liquid SO$_2$, phenol, cresylic acid, furfural, beta, beta-dichlorethyl ether, nitrobenzene, etc. Particularly preferred aromatic extracts suitable for incorporation with the lactams into the compositions of the invention are the highly aromatic extracts derived from bulk distillates, boiling from about 125° C. to about 300° C. under 1 mm. of Hg pressure.

A particularly advantageous characteristic of the lactams or the lactam-rich alkyl phenols, optionally in admixture with a lesser amount of aromatic petroleum extract, is their ability to accelerate to a marked degree the vulcanization of certain synthetic rubber compositions containing them. This is evidenced by the following example showing the marked accelerating effect upon the vulcanization of a butadiene-styrene copolymer composition containing lactam-rich alkyl phenols in combination with a minor amount of aromatic petroleum extract.

*Example III*

To a portion of the crude lactam-rich alkyl phenol fraction (A) of Example I, there was added 5 per cent by weight of a highly aromatic liquid extract of a vacuum distilled petroleum fraction from California crude. The aromatic extract consisted of a brown, mobile liquid having the following properties:

Specific gravity, 20°/4° _____ 1.01
Viscosity at 100° F _____ centistokes __ 62
Viscosity at 210° F _____ do ____ 5
Boiling range at 1 mm. Hg. _____°C __ 130–217

A composition (E) was compounded using a copolymer of butadiene and styrene (GR-S) with the above prepared lactam-rich alkyl phenol fraction in combination with 5% aromatic petroleum extract (C). For comparative purposes, a second composition (F) was prepared in the same manner, except that a neutral petroleum oil fraction known commercially as Circo light oil, was used as plasticizer. The compounded mixtures were prepared according to the formula:

| | Parts by weight |
| --- | --- |
| GR-S | 100 |
| Carbon black (EPC) | 50 |
| Zinc oxide | 5 |
| Plasticizer | 10 |
| Captax (mercaptobenzothiazole) | 1.5 |
| Sulfur | 2 |

A third composition (G) was prepared as above, but with the exception that no plasticizer was employed. A plurality of samples of each of the three compositions (E, F and G) thus obtained were vulcanized at 145° C. All samples were vulcanized under substantially identical conditions, except for the period of vulcanization, which was varied to result in a plurality of vulcanized samples, obtained at progressively increased periods of vulcanization, for each of the compositions. Results obtained in testing the vulcanized samples thus obtained are indicated in the curves shown in the accompanying drawing forming a part of the present specification.

In all of the figures of the drawing the curves marked E, F and G relate to values for the above vulcanized compositions, E, F and G. In the drawing the values for the tensile strength in pounds per square inch, the elongation in per cent, the modulus, and the permanent set in per cent at break, obtained in testing the vulcanized samples of compositions E, F and G, are plotted in Figures I, II, III and IV, respectively, against the time of vulcanization in minutes. Tests on the vulcanized samples were run in accordance with accepted ASTM procedure.

The superiority of the butadiene-styrene copolymer compositions containing the lactam-rich alkyl phenols in combination with a minor amount of aromatic petroleum extract is readily apparent. The excellent values obtained for tensile strength, elongation, modulus and permanent set, at the relatively short times of only ten and twenty minutes, for the butadiene-styrene copolymer compositions (E) containing the lactam-rich alkyl phenols in combination with a minor amount of aromatic petroleum extract, makes apparent the degree to which the vulcanization is accelerated by the presence of the lactam-containing plasticizer.

The incorporation of lactams, or lactam-containing plasticizers, in synthetic rubber compositions in accordance with the process of the invention enables the obtaining of compositions which are of particular value because of their ability to withstand aging. Advantage may be taken of the accelerating effect upon vulcanization by the lactams, or lactam-containing plasticizer, to reduce the sulfur content of the synthetic rubber compositions and thereby attain vulcanizates of particularly improved age-resistance as evidenced by the following example.

*Example IV*

Three compositions were prepared by compounding a copolymer of butadiene and styrene (GR-S) substantially according to the formula given in Example III. In the first of the three compositions thus prepared, the lactam-rich alkyl phenol fraction in combination with 5% aromatic petroleum extract (C) was used as plasticizer. The formula set forth in Example III was departed from in the preparation of this specific compound only to the extent of reducing the sulfur content from 2 to 1.5 parts per hundred of the copolymer by weight. The second composition was prepared using Circo light oil as plasticizer. In preparing the third composition, the plasticizer was omitted entirely. The three compositions thus obtained were vulcanized at 145° C. for the period of time indicated in the following table. A sample of each vulcanizate thus obtained was aged for seven days, and another for 21 days, at a temperature of 80° C. in a continuous stream of air. Results of tests made on the vulcanizates, before and after aging, are indicated in the following table:

| Plasticizer | None | Lactam-rich alkyl phenol fraction containing 5% aromatic extract (C) | Circo Light Oil |
|---|---|---|---|
| Sulfur, parts, per hundred of copolymer | 2.0 | 1.5 | 2.0 |
| Vulcanized compound: | | | |
| Cure, min. at 145° C | 60 | 45 | 60 |
| Before Aging— | | | |
| Tensile strength, p. s. i | 2,915 | 2,905 | 2,125 |
| Elongation at break, per cent | 555 | 450 | 560 |
| Stress at 300% elongation, p. s. i | 1,200 | 1,530 | 720 |
| Permanent set at break, per cent | 15 | 6 | 14 |
| Tear strength, lb./in | 255 | 335 | 165 |
| Hardness, °Shore | 58 | 53 | 47 |
| Aged 7 Days at 80° C.— | | | |
| Tensile strength, p. s. i | 2,280 | 2,465 | 1,945 |
| Elongation at break, per cent | 265 | 380 | 295 |
| Stress at 300% elongation, p. s. i | 1,420 | 1,820 | 1,080 |
| Tear strength, lb./in | 190 | 235 | 175 |
| Aged 21 Days at 80° C.— | | | |
| Tensile strength, p. s. i | 2,120 | 2,365 | 1,945 |
| Elongation at break, per cent | 225 | 350 | 245 |
| Stress at 300% elongation, p. s. i | 1,790 | 1,880 | 1,520 |
| Tear strength, lb./in | 160 | 190 | 155 |

The superior resistance to aging exhibited by the products of the accelerated vulcanization of the lactam-containing compositions is readily apparent from the foregoing example.

The activating effect of the lactams or lactam-rich alkyl phenols upon the vulcanization of synthetic rubber compositions is far greater than that obtainable with the use of such materials as, for example, a coal tar phenolic plasticizer, as shown by the following example:

*Example V*

Two compositions were prepared by compounding a butadiene-styrene copolymer-containing composition substantially in accordance with the formula set forth in Example III with the exception that sulfur loadings of 10 parts per 100 of copolymer were employed. One composition was prepared using the lactam-rich alkyl phenol fraction in combination with 5% aromatic petroleum extract (C) as plasticizer. In preparing the composition, a phenolic coal tar fraction known commercially as "Bardol" was used as plasticizer. Samples of each composition were vulcanized for the periods of time set forth in the following table. The vulcanizates were subjected to tests carried out in accordance with accepted ASTM procedures. Results obtained for each of the samples are indicated in the following table:

| Plasticizer | Lactam-rich alkyl phenols containing 5% Aromatic Petroleum Extract (C) | | | | Bardol | | | |
|---|---|---|---|---|---|---|---|---|
| Cure, min. at 145° C | 10 | 15 | 20 | 30 | 15 | 20 | 30 | 45 |
| Tensile strength, p. s. i | 1,610 | 2,715 | 2,865 | 2,495 | 1,215 | 2,270 | 2,985 | 2,885 |
| Elongation, per cent | 625 | 610 | 495 | 390 | 655 | 630 | 510 | 430 |
| Stress at 300% elong. p. s. i | 420 | 950 | 1,340 | 1,790 | 270 | 650 | 1,460 | 1,860 |
| Permanent set at break, per cent | 15 | 13 | 10 | 5 | 21 | 19 | 15 | 9 |
| Tear strength, lb./in | | | 335 | | | | 285 | 260 |
| Hysteresis: temp. rise, ° C | | | 68 | | | | 81 | 76 |
| Scorch time (Mooney), at 125° C., min | | 41 | | | | | 42 | |

The greater activating effect upon vulcanization by the lactam-containing alkyl phenols is evidenced by the foregoing example showing the attainment of an optimum cure in 20 minutes, whereas the use of a purely phenolic plasticizer such as "Bardol" necessitates the use of 30 to 45 minutes. A particularly advantageous characteristic of the compositions of the invention resides in the fact that such greater activity at vulcanizing temperatures is not accompanied by greater activation at the processing temperatures to which the compositions are subjected prior to vulcanization, as evidenced by substantially identical values for the Mooney scorch times. The "cure/burn" ratio is therefore more favorable for the composition containing lactam-rich alkyl phenols and the compounded stocks comprising them are safer to handle in operations on a practical scale than a stock containing a purely phenolic material such as "Bardol," the composition of which stock has been adjusted to vulcanize at the same rapid rate.

A further outstanding advantage of the lactam-containing compositions of the invention over those containing a purely phenolic material, such as "Bardol," as the plasticizer resides in their higher tear strength and lower values for hysteresis at the optimum cure. The compositions of the invention comprising, for example, a copolymer of butadiene and containing a lactam, or lactam-rich alkyl phenols, therefore obviate to at least a substantial degree the difficulties heretofore encountered in many vulcanizates comprising copolymers of butadiene, due to a deficiency in wearing quality and failure resulting from overheating caused by hysteresis.

Tests of tensile strength and ultimate elongation were performed according to ASTM designation D412-41, and those of tear strength according to ASTM designation D624-41T. Hysteresis is the temperature rise at equilibrium in an electro-magnetic flexometer patterned after that described in Ind. Eng. Chem. 35, 964 (1943). Cut growth designates the number of flexes (in thousands) required to cause a 1 cm. increase in length of a nick in a grooved flex piece at 100° C. when flexed at a rate of 120 cycles per minute through an angle of 83° to open the cut and through a 20° angle in the opposite direction to compress the cut. Freeze resistance was determined by the T-50 test, ASTM designation D599-40T.

The invention claimed is:

1. A composition consisting essentially of a vulcanizable rubber-like conjugated diene hydrocarbon polymer and from 10 to 25% by weight of said polymer of a lactam, the carbon and nitrogen atoms of the characteristic lactam group —NH—CO— of said lactam being linked by an unsubstituted hydrocarbon radical.

2. A composition consisting essentially of a vulcanizable rubber-like conjugated diene hydrocarbon polymer and as plasticizing agent therefor 10 to 25% by weight of said polymer of lactam-containing alkyl phenols of cracked petroleum origin boiling from 250 to 360° C. at atmospheric pressure and soluble in dilute aqueous caustic solution, and containing from 1 to 20% by weight of the total plasticizing agent of aromatic petroleum extract boiling from 125° C. to 300° C. under a pressure of 1 mm. Hg, the nitrogen and carbon atoms of the characteristic lactam group —NH—CO— of said lactam being linked by an unsubstituted hydrocarbon radical.

3. A composition consisting essentially of the vulcanizate of the composition claimed in claim 1.

4. A composition consisting essentially of a vulcanizable rubber-like polymer of butadiene and from 10 to 25% by weight of said polymer of a lactam, the carbon and nitrogen atoms of the characteristic lactam group —NH—CO— of said lactam being linked by an unsubstituted hydrocarbon radical.

5. A composition consisting essentially of a vulcanizable rubber-like polymer of butadiene and as plasticizing agent therefor from 10 to 25% by weight of said polymer of lactam-containing alkyl phenols of cracked naphthenic petroleum origin boiling from 250° C. to 360° C. at atmospheric pressure and soluble in dilute aqueous caustic solution, and containing from 1 to 20% by weight of the total plasticizer of aromatic petroleum extract boiling from 125° C. to 300° C. under a pressure of 1 mm. Hg, the carbon and nitrogen atoms of the characteristic lactam group —NH—CO— of said lactam being linked by an unsubstituted hydrocarbon radical.

6. A composition consisting essentially of a vulcanizate of the composition claimed in claim 4.

7. A composition consisting essentially of a vulcanizable rubber-like copolymer of butadiene with acrylonitrile and as a plasticizer therefor from 10 to 25% by weight of said copolymer of a lactam of cracked naphthenic petroleum origin, the carbon and nitrogen atoms of the characteristic lactam group —NH—CO— of said lactam being linked by an unsubstituted hydrocarbon radical.

8. A composition consisting essentially of a vulcanizable rubber-like copolymer of butadiene with acrylonitrile and as a plasticizer therefor from 10 to 25% by weight of said copolymer of lactam-containing alkyl phenols of cracked naphthenic petroleum origin boiling in the range of from 290° C. to 325° C. at atmospheric pressure and soluble in dilute aqueous caustic solution, and containing from 5 to 10% by weight of the total plasticizer of aromatic petroleum extract boiling in the range of from 125° C. to 300° C. at a pressure of about 1 mm. Hg, the carbon and nitrogen atoms of the characteristic lactam group —NH—CO— of said lactam being linked by an unsubstituted hydrocarbon radical.

9. A composition consisting essentially of a vulcanizate of the composition of claim 7.

10. A composition consisting essentially of a vulcanizable rubber-like copolymer of butadiene with styrene and as a plasticizer therefor 10 to 25% by weight of said copolymer of a lactam of cracked naphthenic petroleum origin, the carbon and nitrogen atoms of the characteristic lactam group —NH—CO— of said lactam being linked by an unsubstituted hydrocarbon radical.

11. A composition consisting essentially of a vulcanizable rubber-like copolymer of butadiene with styrene and as a plasticizer therefor from 10 to 25% by weight of said copolymer of lactam-containing alkyl phenols of cracked naphthenic petroleum origin boiling in the range of from 290° C. to 325° C. at atmospheric pressure and soluble in dilute aqueous caustic solution, and containing from 5 to 10% by weight of the total plasticizer of aromatic petroleum extract boiling in the range of from 125° C. to 300° C. at a pressure of 1 mm. Hg, the carbon and nitrogen atoms of the characteristic lactam group —NH—CO— of said lactam being linked by an unsubstituted hydrocarbon radical.

12. A composition consisting essentially of the vulcanizate of the composition of claim 10.

DANIEL B. LUTEN, JR.
BILLEE O. BLACKBURN.
FRANK M. McMILLAN.

REFERENCES CITED

The following references are of record in the file of this patent:

UNITED STATES PATENTS

| Number | Name | Date |
|---|---|---|
| 2,295,600 | Natelson et al. | Sept. 15, 1942 |
| 2,321,036 | Luten et al. | June 8, 1943 |
| 2,379,482 | Frolich | July 3, 1945 |
| 2,404,719 | Houtz | July 23, 1946 |
| 2,415,541 | Soday | Feb. 11, 1947 |
| 2,416,668 | Schroeder | Mar. 4, 1947 |

FOREIGN PATENTS

| Number | Country | Date |
|---|---|---|
| 833,763 | France | July 16, 1943 |

OTHER REFERENCES

Gruse et al.: Chemical Technology of Petroleum, 2nd ed., 1942 (McGraw-Hill), page 115.